UNITED STATES PATENT OFFICE.

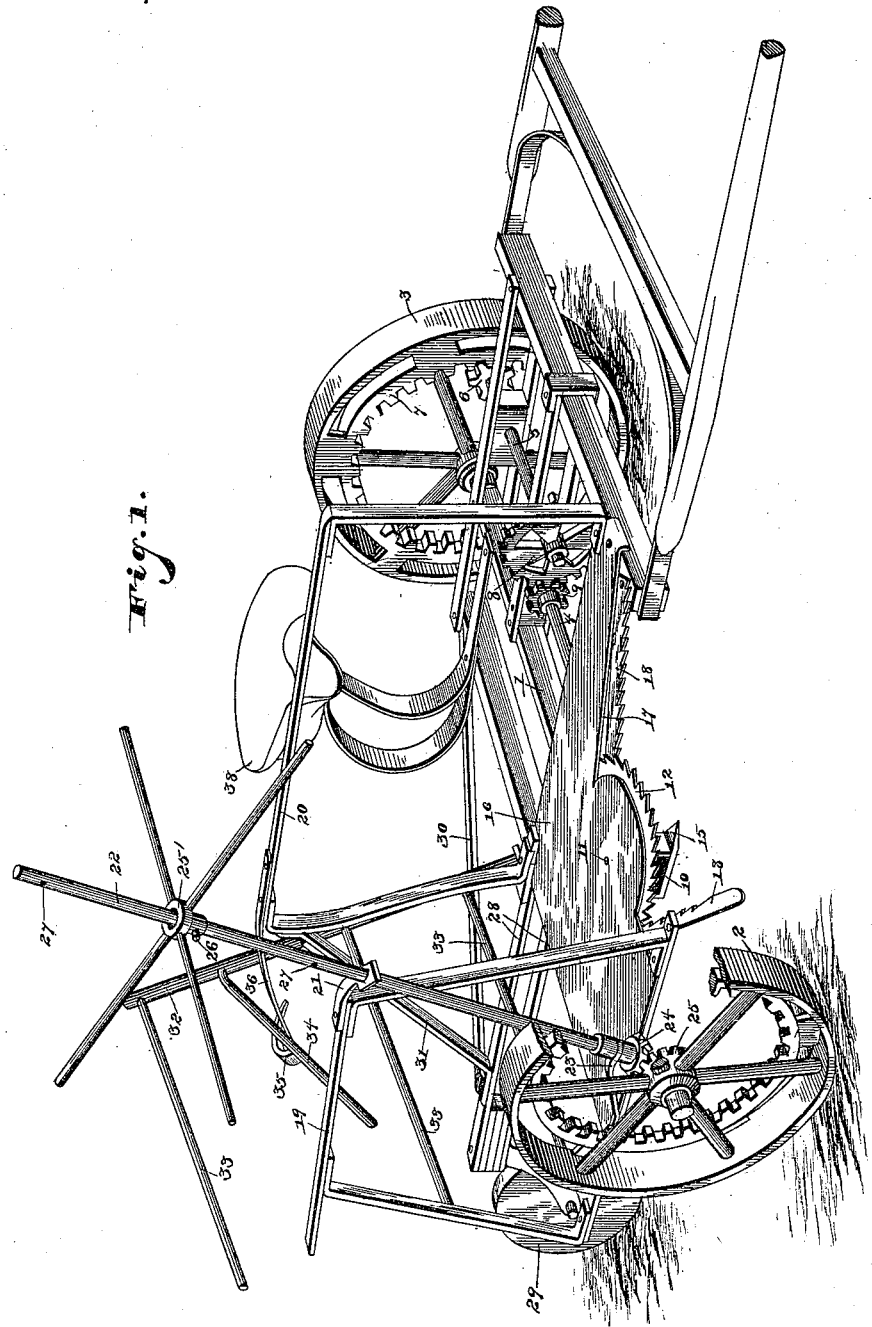

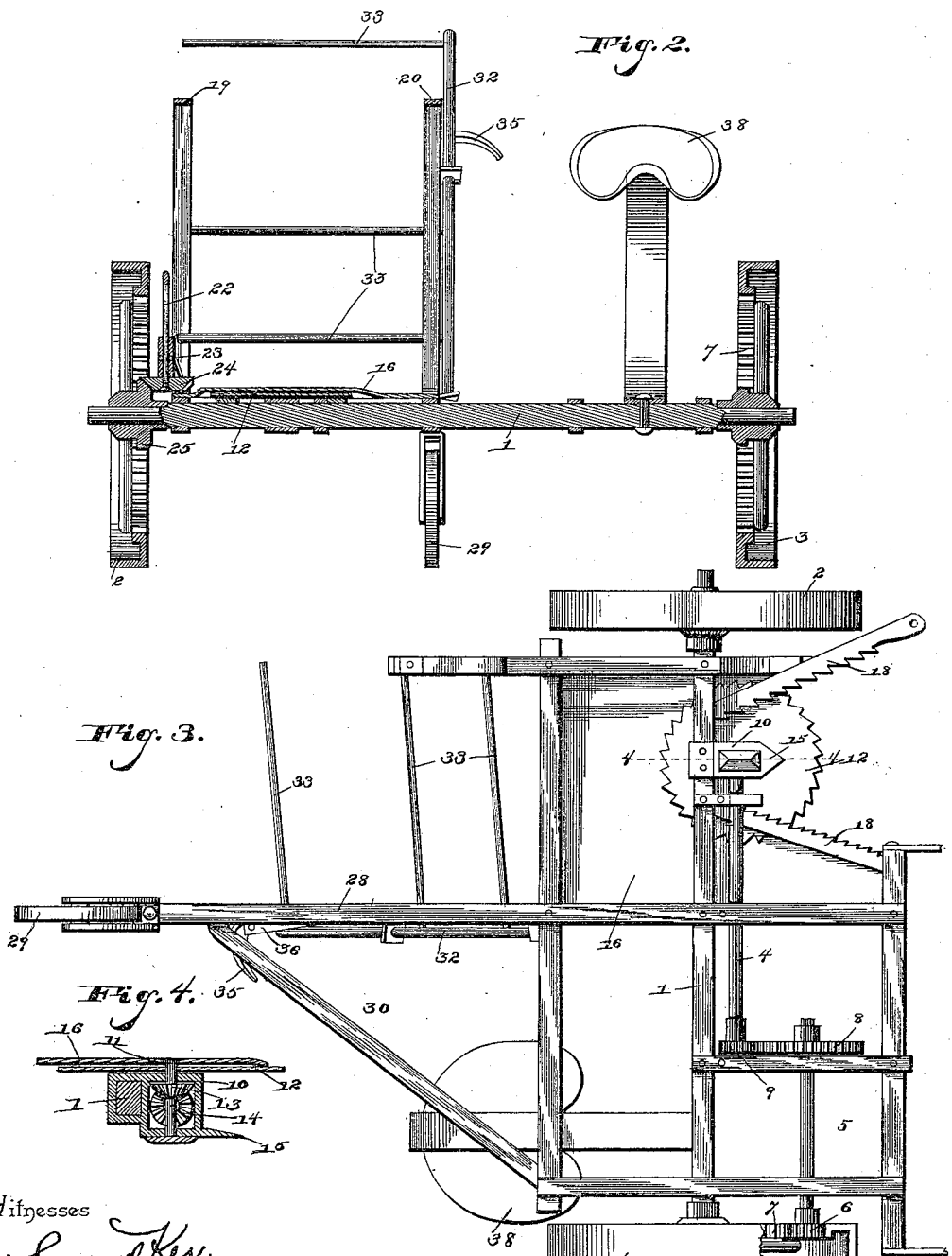

JOHN E. BURRUS AND LEWIS D. HALL, OF CONCORDIA, KANSAS.

CORN-HARVESTER.

SPECIFICATION forming part of Letters Patent No. 438,758, dated October 21, 1890.

Application filed June 21, 1890. Serial No. 356,255. (No model.)

*To all whom it may concern:*

Be it known that we, JOHN E. BURRUS and LEWIS D. HALL, citizens of the United States, residing at Concordia, in the county of Cloud and State of Kansas, have invented a new and useful Corn-Harvester, of which the following is a specification.

This invention relates to corn-harvesters; and it has for its object to construct a machine of this class which shall be adapted for cutting corn, cane, ensilage, fodder, or the like.

It has for its further object to construct a machine of this class which shall possess superior advantages in point of simplicity, durability, and general efficiency.

With these ends in view the invention consists in the improved construction, arrangement, and combination of parts, which will be hereinafter fully described, and particularly pointed out in the claims.

In the drawings, Figure 1 is a perspective view of a corn-harvester embodying our improvements. Fig. 2 is a transverse sectional view. Fig. 3 is a bottom plan view. Fig. 4 is a sectional detail view taken on the line 4 4 in Fig. 3.

Like numerals of reference indicate like parts in all the figures.

The frame of our improved machine is mounted upon the axle 1, upon the spindles of which the supporting-wheels 2 and 3 are journaled. The frame is provided with bearings for a shaft 4, arranged in front of and parallel to the axle. Another shaft 5 is journaled in suitable bearings in front of and parallel to the shaft 4. The shaft 5 is provided at its outer end with a pinion 6, meshing with an internal gear-wheel 7, formed upon or secured to the transporting-wheel 3 of the machine. The inner end of the shaft 5 is provided with a spur-wheel 8, meshing with a pinion 9 upon the shaft 4, to which latter a rapid rotary motion is thus transmitted from the transporting-wheel 3. The inner end of the shaft 4 is journaled in a box 10, which is also provided with bearings for a vertical shaft 11, which carries the circular toothed cutter 12. The shaft or arbor 11 of the said cutter is provided with a bevel-pinion 13, meshing with a similar pinion 14 upon the adjacent end of the shaft 4, from which latter motion is thus transmitted to the cutter. The gears 13 and 14 are located within the box 10, and are thus guarded and protected. The front end of the box 10 is provided with a triangular or pointed guard 15 to spread and separate the stocks and stumps that may be encountered.

The frame of the machine supports a platform 16, the front of which is recessed, as shown at 17, to guide the corn which is to be cut into contact with the revolving cutter. Adjacent to the sides of the latter are arranged the straight-edged auxiliary cutters 18, the cutting-edges of which are preferably toothed, as shown. These auxiliary cutters diverge in a forward direction, so that the stands of corn encountered by the machine will be forced into contact with the revolving cutter.

The frame of the machine is provided adjacent to the sides of the platform with the railings 19 and 20. The outer railing is provided with an arm or bracket 21, which forms one of the bearings for a forwardly-inclined shaft 22, the lower end of which is journaled in a bracket 23, which is secured to the platform of the machine. The lower end of the shaft 22 is provided with a pinion 24, meshing with a pinion 25, which is mounted upon the hub of the adjacent supporting-wheel 2 of the machine. The upper end of the shaft 22 carries the reel 25', which is adjustable upon the said shaft, it being connected with the latter at any desired adjustment by means of a key 26, passing through a perforation in the hub of the reel and through one of a series of perforations 27 in the shaft 22. The arms of the reel extend over the platform of the machine and serve to force the material which is to be cut into contact with the cutting apparatus.

An arm or bracket 28 is extended rearwardly from the frame, and is connected with the latter by means of a diagonal brace 30. The rear end of the arm or bracket 28 is provided with a swiveled caster-wheel 29, which supports the rear end of the machine. An inclined brace 31 connects the railing 20 with the bracket 28. Bearings are provided in said inclined brace and upon the frame of the machine for a rearwardly-inclined shaft 32, which is provided with laterally-extending arms 33, that project across or between the railings 19 and 20 and form a gate to support the cut corn and to enable the latter to be dropped whenever a sufficient quantity has been accumulated. The gate-shaft 32 is provided with an operating-arm 34, that engages a latch 35, mounted upon a spring 36, which extends rearwardly from the rail 19. By this latch mechanism the gate is normally held in a locked or closed position. When it is desired to dump the load, this may be accomplished by simply depressing the latch-spring, thus disengaging the latch from the arm 34 and permitting the gate to swing open. When it is desired to shut the gate, the arm 34 will readily pass over the latch 35, which is curved, as shown, so as to be readily depressed against the tension of the spring, which supports it by contact with the said arm 34.

The frame of the machine supports the seat 38 for the driver, and said frame is also provided with shafts for the attachment of the draft.

The operation of our invention will be readily understood from the foregoing description, taken in connection with the drawings hereto annexed. When the machine is driven over the field, the stands of corn will be guided into contact with the revolving knife or cutter, and will thus be severed, the reel serving to carry the severed corn rearwardly upon the platform, where it rests upon the bars of the gate. When a sufficient quantity has been accumulated, the gate is permitted to swing open and the cut corn permitted to drop upon the ground.

We have in the foregoing described our invention as being adapted to cut at one operation a single row of corn; but the machine may readily be constructed to cut at a single operation two rows of corn, the cutting mechanism, the platform, and the gate being simply duplicated.

Having thus described our invention, we claim—

1. In a corn-harvester, the combination of the frame, the supporting-wheels, a transverse shaft having a bevel-pinion at one end, a vertical shaft having a bevel-pinion meshing therewith and carrying at its upper end a toothed circular cutter, means for transmitting motion to the cutter-operating shaft from one of the drive-wheels of the machine, and the diverging toothed cutters arranged adjacent to the revolving cutter, substantially as set forth.

2. In a corn-harvester, the combination, with the frame having the supporting-wheels, of a box or casing having bearings for the cutter-shaft and for one end of the drive-shaft, said box or casing being provided with a triangular or a pointed forwardly-extending guard, substantially as and for the purpose set forth.

3. In a corn-harvester, the combination, with the frame and its supporting-wheels, of the rotary cutter, means for transmitting motion to said cutter from one of the drive-wheels, the diverging toothed cutters, the reel-shaft, a bevel-pinion upon the latter meshing with a bevel-pinion upon the hub of the adjacent drive-wheel, the railings, and the gate, substantially as and for the purpose set forth.

4. In a corn-harvester, the combination of the frame, its supporting-wheels, the rotary cutting apparatus, the diverging toothed cutters, the reel, and the railings, one of said railings being provided with bearings for an inclined gate-shaft, and with a rearwardly-extending spring supporting a latch, substantially as set forth.

5. In a corn-harvester, the combination, with the frame having the railings, of a rearwardly-inclined shaft mounted in bearings in one of said railings, and having laterally-extending arms and a rearwardly-extending locking-bar, and a spring extending rearwardly from the said railing and having a curved latch engaging the said locking-bar, substantially as and for the purpose herein set forth.

In testimony that we claim the foregoing as our own we have hereto affixed our signatures in presence of two witnesses.

JOHN E. BURRUS.
LEWIS D. HALL.

Witnesses:
W. W. BOWMAN,
J. O. ORYER, Jr.